L. R. DAVIS.
RESILIENT TIRE.
APPLICATION FILED JULY 17, 1920.
1,382,630.
Patented June 28, 1921.
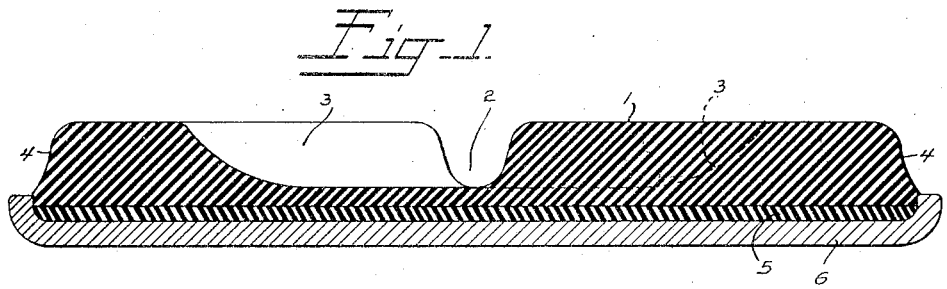
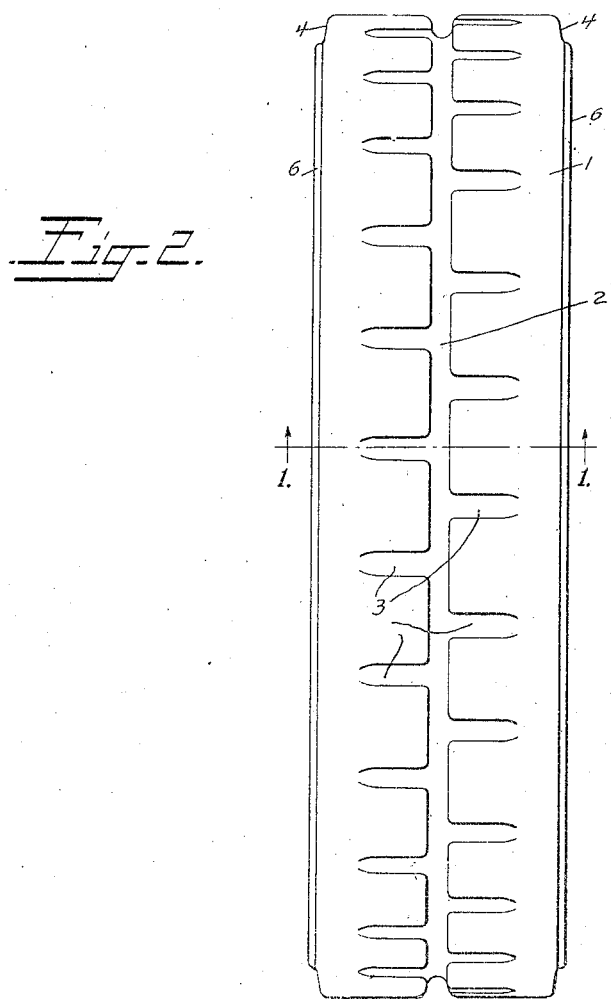
Inventor
Laurence R. Davis
By his Attorney
Ernest Hopkinson

UNITED STATES PATENT OFFICE.

LAURENCE R. DAVIS, OF PROVIDENCE, RHODE ISLAND, ASSIGNOR TO REVERE RUBBER COMPANY, A CORPORATION OF RHODE ISLAND.

RESILIENT TIRE.

1,382,630.

Specification of Letters Patent. Patented June 28, 1921.

Application filed July 17, 1920. Serial No. 397,111.

*To all whom it may concern:*

Be it known that I, LAURENCE R. DAVIS, a citizen of the United States, residing at Providence, in the county of Providence and State of Rhode Island, have invented certain new and useful Improvements in Resilient Tires, of which the following is a full, clear, and exact description.

This invention relates to tires for vehicles and particularly to a solid resilient type thereof.

Heretofore tires have been made in a wide variety of designs suited to various needs of the trade. The present invention aims to provide a new and improved type of tire that will combine the desirable traction qualities of block tires and the resiliency of certain types of continuous solid tires, these results being obtained, however, without abandoning the simple and inexpensive method of molding and vulcanizing the tire in one piece and directly to a metal band.

Very briefly, the invention may be said to consist of a tire that is grooved intermediate its edges peripherally and transversely.

An embodiment of the invention is illustrated in the accompanying drawings, in which—

Figures 1 and 2 are views of the tire in section and plan respectively, the former being taken on the line 1—1 of the latter.

As illustrated, the tire 1 is formed with a central groove 2 extending peripherally about its tread and with transverse or cross notches 3 extending laterally from the longitudinal groove to a point within the side walls 4 of its body portion and being arranged in staggered relation on opposite sides of the central groove. The grooves and notches may be of any suitable shape and depth, but are preferably shaped and deepened in the proportions shown. The transverse extent of the notches 3 may be varied as desired but they must not individually be greater than half the total width of the tire as otherwise no unbroken tread surfaces would be left flanking the same. The bottom walls of the notches taper upwardly and outwardly at their outer extremities and merge into the tread surface so as to leave no abrupt shoulder. By this feature of the construction mutilation or destruction is provided against. Alternate notches are preferably staggered as shown, but obviously some advantages of the invention may be realized with the notches arranged opposite one another.

The tire is constructed as usual with a tread portion of suitable vulcanizable composition united to a hard rubber base 5 which is vulcanized directly to a channel or band 6 of steel or other suitable material. And the configuration of the tread is imparted by suitably shaping the faces of the mold or sectional tread ring in contact therewith during cure.

The tire described is especially designed for tractor service where heavy loads are to be carried at a fair rate of speed. It is useful, however, for service in general of the same character. The configuration of the tread portion, that is, the central and transverse grooves, permit flow or distortion of the vulcanized rubber body and hence afford resiliency. The arrangement and location of the grooves enables the road to be gripped for traction purposes much the same as staggered block tires, but the dead ending of the notches or transverse grooves prevents the air from blowing laterally out from under that portion of the tread under compression as in block tires thereby augmenting traction. The outer margin of the tread being continuous and unbroken, no series of corners is presented for stones, curbs, or other surface objects to chip off. Furthermore, the arrangement or location of the several grooves and their proportions is such that in the vulcanizing operation the groove forming projections on the mold sections enable the heat to be conveyed to all parts of the tire at a uniform rate, or nearly so, and thus the tire may be made with uniform wearing qualities throughout.

Having thus described my invention, what I claim and desire to protect by Letters Patent is:

1. A cushion tire of solid rubber having its tread formed with peripheral and transverse grooves flanked by continuous and unbroken tread surfaces immediately adjacent the side walls of the tire.

2. A one-piece cushion tire of solid rubber having its tread formed with a central peripheral groove and with notches communicating with said central groove, each of said notches extending laterally from the groove a distance less than half the total width of the tire, and continuous unbroken tread surfaces flanking the notches.

Signed at Providence, Rhode Island, this 12th day of June, 1920.

LAURENCE R. DAVIS.